United States Patent
Kanoh

(10) Patent No.: US 9,552,302 B2
(45) Date of Patent: Jan. 24, 2017

(54) DATA PROCESSING APPARATUS, DATA PROCESSING METHOD AND PROGRAM RECORDING MEDIUM

(71) Applicant: NEC Corporation, Minato-ku, Tokyo (JP)

(72) Inventor: Yasushi Kanoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 101 days.

(21) Appl. No.: 14/562,980

(22) Filed: Dec. 8, 2014

(65) Prior Publication Data

US 2015/0169241 A1    Jun. 18, 2015

(30) Foreign Application Priority Data

Dec. 12, 2013  (JP) .................................. 2013-256697

(51) Int. Cl.
| | |
|---|---|
| *G06F 12/00* | (2006.01) |
| *G06F 12/10* | (2016.01) |
| *G06F 13/00* | (2006.01) |
| *G06F 13/28* | (2006.01) |

(52) U.S. Cl.
CPC .......... *G06F 12/1009* (2013.01); *G06F 12/10* (2013.01)

(58) Field of Classification Search
CPC ............................ G06F 12/1009; G06F 12/10
See application file for complete search history.

(56) References Cited

U.S. PATENT DOCUMENTS

| | | | | |
|---|---|---|---|---|
| 5,644,755 A | * | 7/1997 | Wooten ............... | G06F 9/45533 703/23 |
| 5,987,583 A | * | 11/1999 | Triece ................ | G06F 9/30101 711/214 |
| 6,625,718 B1 | * | 9/2003 | Steiner .................... | G06F 9/342 711/200 |
| 2013/0097405 A1 | * | 4/2013 | Thorvaldsson ......... | G06F 12/02 711/216 |

FOREIGN PATENT DOCUMENTS

| | | |
|---|---|---|
| JP | S63-89948 A | 4/1988 |
| JP | H05173800 A | 7/1993 |
| JP | H07160590 A | 6/1995 |
| JP | 2000224648 A | 8/2000 |

OTHER PUBLICATIONS

Japanese Office Action for JP Application No. 2013-256697 mailed on Feb. 10, 2015 with English Translation.
Yukiho Fujisawa, "Interface issuing an extra No. SH-1&SH-2 Microcomputer Introduction", CQ Publication Corporation, Sep. 1, 2004, pp. 36-38.
Intel Corporation, "Intel Architecture Software Developer's Manual", First Volume: Basic Architecture, CQ Publication Corporation, 1997, pp. 5-6 to 5-10.

* cited by examiner

*Primary Examiner* — Mark Giardino, Jr.

(57) ABSTRACT

To enable moving and copying structured data as block data at high speed, and tracing the moved or copied structured data at high speed. A data processing apparatus that processes structured data including a pointer includes a processing unit configured to process the structured data that uses as the pointer a relative address whose origin is the address of a word in which the pointer is stored.

8 Claims, 14 Drawing Sheets

Fig. 11

| 100 | A |
| 101 | 103 |
| 102 | 105 |
| 103 | B |
| 104 | C |
| 105 | D |
| 106 | E |
| 107 | F |

Fig. 12

| 200 | A |
| 201 | 103→203 |
| 202 | 105→205 |
| 203 | B |
| 204 | C |
| 205 | D |
| 206 | E |
| 207 | F |

Fig. 13

| 100 | A |
| --- | --- |
| 101 | +2 |
| 102 | +3 |
| 103 | B |
| 104 | C |
| 105 | D |
| 106 | E |
| 107 | F |

Fig. 14

| 200 | A |
| --- | --- |
| 201 | +2 |
| 202 | +3 |
| 203 | B |
| 204 | C |
| 205 | D |
| 206 | E |
| 207 | F |

DATA PROCESSING APPARATUS, DATA PROCESSING METHOD AND PROGRAM RECORDING MEDIUM

This application is based upon and claims the benefit of priority from Japanese Patent Application No. 2013-256697, filed on Dec. 12, 2014, the disclosure of which is incorporated herein in its entirety by reference.

TECHNICAL FIELD

The present invention relates to a data processing apparatus, a data processing method and a program recording medium that process structured data. In particular, the present invention relates to a data processing apparatus, a data processing method and a program recording medium that handle structured data that includes a pointer.

BACKGROUND ART

In recent years, scientific computation has been put to practical use, and simulations using complicated structures that exist in the real world are now performed. In such a simulation, a complicated structure in the real world is expressed within a computer by a form of structured data that employs pointers. As a pointer in structured data, either an absolute address or a relative address is employed, and either type of address has advantages and disadvantages.

Japanese Patent Application Publication No. 63-89948 (referred to as Patent Literature 1) discloses a data processing apparatus that has two units that solve problems resulting from the use of absolute addresses and the use of relative addresses. A first unit of the data processing apparatus is the unit configured to represent a pointer in the structured data by a relative address, and convert the relative address into an absolute address. A second unit of the data processing apparatus is the unit configured to represent a pointer in the structured data by an absolute address, and add or subtract a displacement in address to or from the values of all the pointers when the structured data is copied.

According to Patent Literature 1, such relative addresses that the beginning of the structured data is an origin are used as pointers, so that there is no need to rewrite the pointers when the entire structured data is moved or copied. Furthermore, the pointers of relative addresses can be converted into the pointers of absolute addresses by adding the beginning address of the structured data in response to the kind of a tag that each element (word) of the structured data contains. As a result, the overhead in address conversion can be reduced so that the high-speed processing of the structured data that includes pointers becomes possible.

In the ordinary processing of structured data, such a problem occurs, when structured data that employs pointers of absolute addresses is moved or copied, that it is necessary to copy one element at a time while tracing the entire original structure in accordance with the pointers, which requires a considerable amount of processing time.

In the ordinary processing of structured data, it is hard to immediately determine whether each word is a pointer or a value. Therefore, it is necessary, while the structured data is being traced, to determine whether the word is a pointer or a value, and to perform such an operation as to add the difference from the beginning address if the word is a pointer, and as not to add the difference if the word is a value. It takes several ten times of the processing time required when a certain area is moved or copied as a block.

Furthermore, in the data processing apparatus described in the foregoing Patent Literature 1, such a problem occurs that it is necessary to know the beginning address of structured data and to be uniquely determined beforehand. A reason for this is that ordinary structured data has a very complicated structure and it is difficult to immediately determine the beginning address of structure. For example, when pointers are employed among a plurality of structural bodies, the beginning addresses of a plurality of the structural bodies are sometimes needed at the time of processing structured data. In that case, such a problem occurs according to the method of Patent Literature 1 that there is a shortage of the register area.

Further, such a problem occurs according to the method disclosed by the foregoing Patent Literature 1 that the structured data moved or copied in an ordinary computer is hard to be traced at high speed. A reason for this is that the data of each word is identified whether the data is a pointer by the kind of the tag in Patent Literature 1, and pointers of absolute addresses obtained by adding the beginning address of structure are used to refer to elements of the structure, but ordinary computers do not have such tags.

SUMMARY

An object of the present invention is to provide a data processing apparatus, a data processing method and a data processing program that are capable of moving and copying structured data as block data at high speed and tracing the moved or copied structured data at high speed.

The data processing apparatus according to the present invention is a data processing apparatus that processes structured data including a pointer, and includes a processing unit configured to process the structured data that uses as the pointer a relative address whose origin is an address of a word in which the pointer is stored.

The data processing method according to the present invention is a data processing method that processes structured data including a pointer, and processes the structured data that uses as the pointer a relative address whose origin is an address of a word in which the pointer is stored.

The program recording medium according to the present invention is a program recording medium which records a data processing program that processes structured data including a pointer, the data processing program causing a computer to execute: when the structured data that uses as the pointer a relative address whose origin is an address of a word in which the pointer is stored is transferred between a first storage area and a second storage area, a process of receiving, as an input, a logical address of data that is an object execution of an instruction, converting the logical address into a physical address, and outputting the physical address to the first storage area; a process of receiving an initial signal that is always 0 and the logical address as inputs, and selecting and outputting either one of the address signal or the initial signal according to a control signal that indicates whether data is a pointer; and a process of receiving an output of the selection unit as an input, performing a computation by using the output of the selection unit and data obtained from the first storage area or the second storage area, and converting between a relative address and an absolute address.

According to the data processing apparatus, the data processing method and the program recording medium of the present invention, it is possible to move and copy structured data as block data at high speed and trace the moved and copied structured data at high speed.

BRIEF DESCRIPTION OF THE DRAWINGS

Exemplary features and advantages of the present invention will become apparent from the following detailed description when taken with the accompanying drawings in which:

FIG. 11 is a conceptual diagram showing a comparative example in which absolute-address pointers are employed as pointers;

FIG. 12 is a conceptual diagram showing an example of copying structural data in which absolute-address pointers in the comparative example are employed as pointers;

FIG. 13 is a conceptual diagram showing an example of the case where relative-address pointers are employed as pointers in structured data processed by the data processing apparatus according to the second exemplary embodiment of the present invention;

FIG. 14 is a conceptual diagram showing an example in which the data processing apparatus according to the second exemplary embodiment of the present invention copies structured data that employs relative-address pointers as pointers;

EXEMPLARY EMBODIMENT

Exemplary embodiments of the invention will be described below, using the drawings. Although in the exemplary embodiments described below, technically preferable limitations for carrying out the invention are provided, the scope of the invention is not limited to the description below.

(First Exemplary Embodiment)

Figure 1:
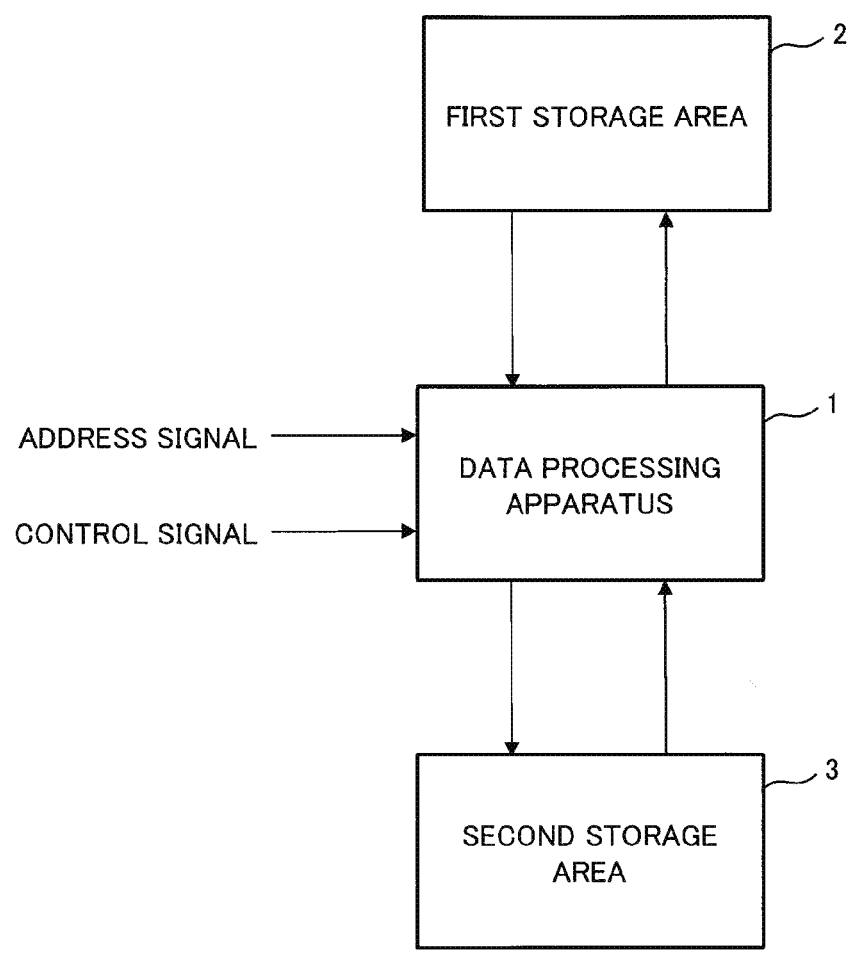
FIG. 1 is a block diagram showing a functional configuration of a data processing system according to a first exemplary embodiment of the present invention.
Figure 2:
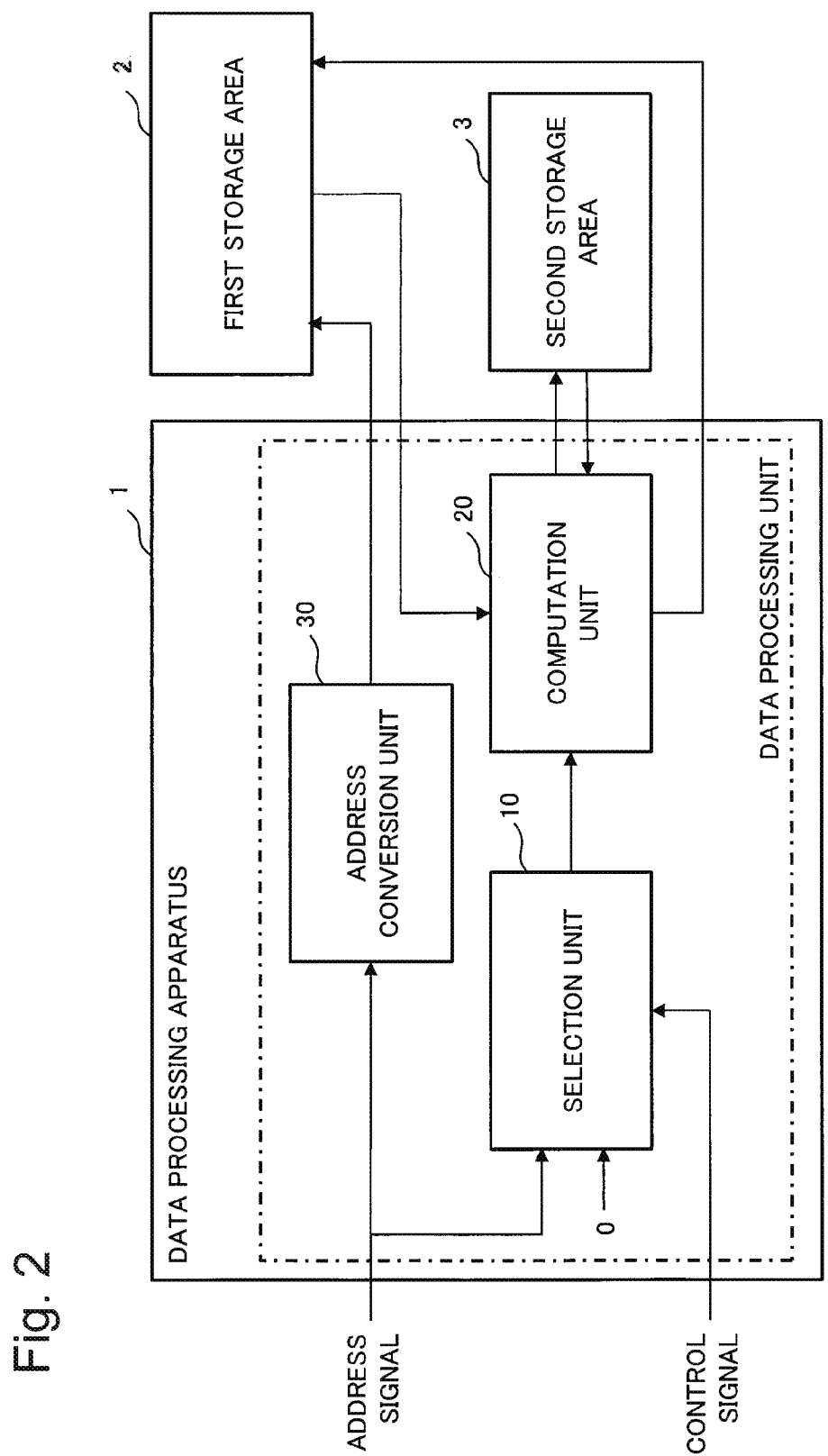
FIG. 2 is a block diagram showing an internal configuration of a data processing apparatus according to the first exemplary embodiment of the present invention.
Figure 3:
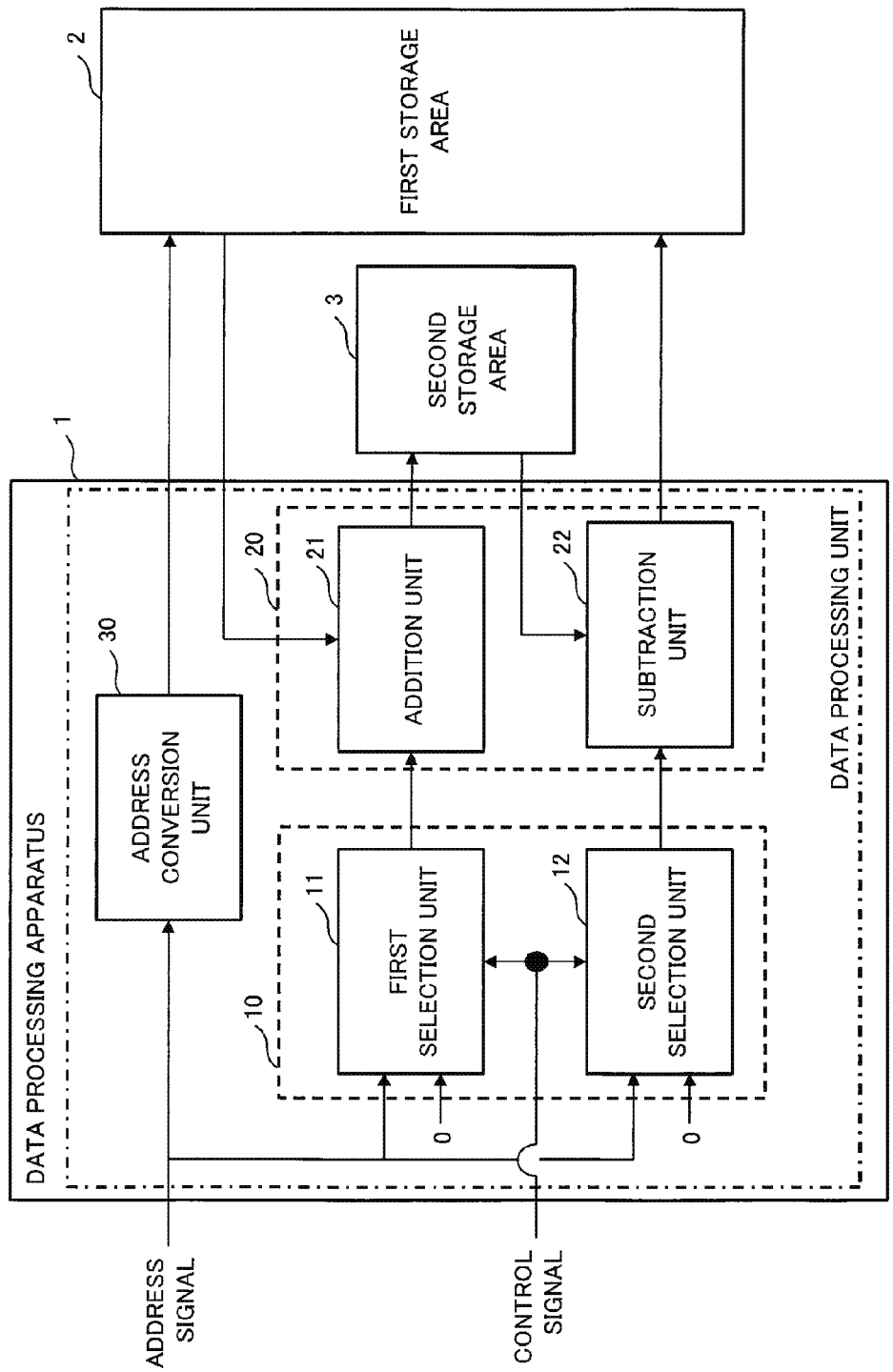
FIG. 3 is a block diagram showing an internal configuration of a data processing apparatus according to the first exemplary embodiment of the present invention.
Figure 4:
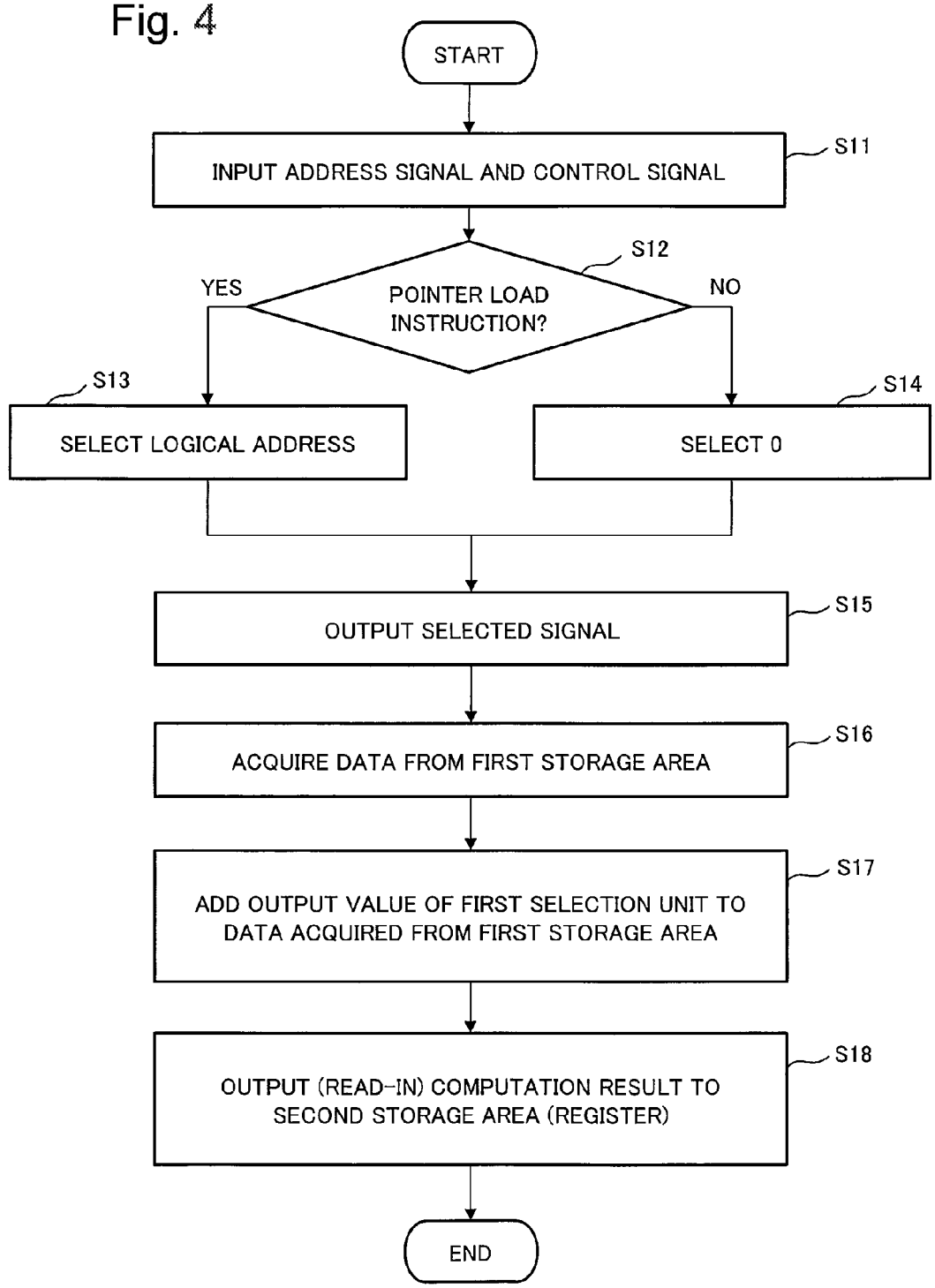
FIG. 4 is a flowchart for describing a load operation in a data processing apparatus according to the first exemplary embodiment of the present invention.
Figure 5:
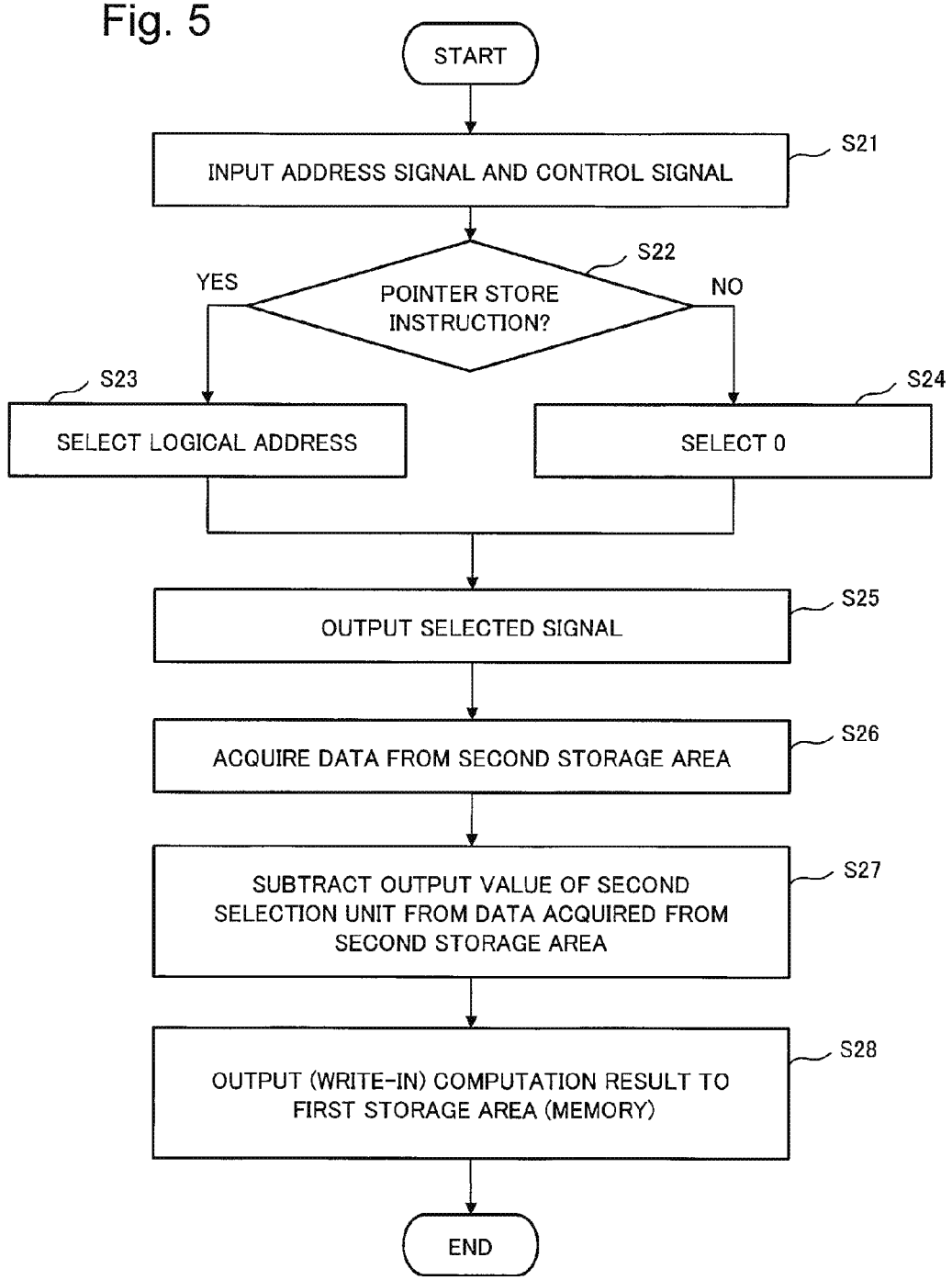
FIG. 5 is a flowchart for describing a store operation in the data processing apparatus according to the first exemplary embodiment of the present invention.
Figure 6:
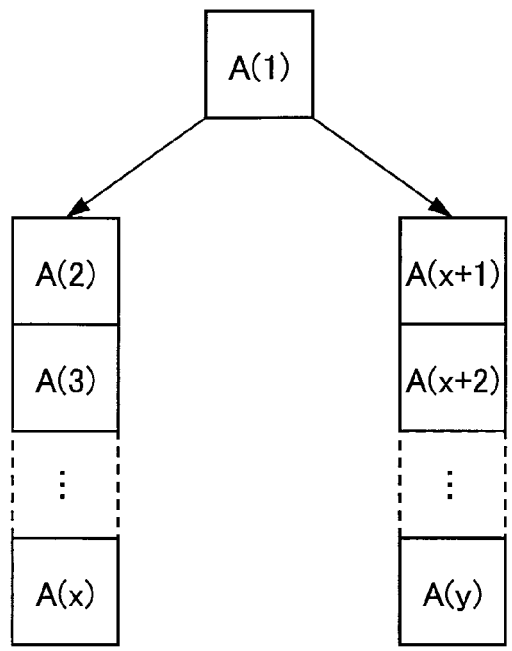
FIG. 6 is a conceptual diagram showing an example of a structure of structured data to be processed by the data processing apparatus according to the first exemplary embodiment of the present invention.
Figure 7:
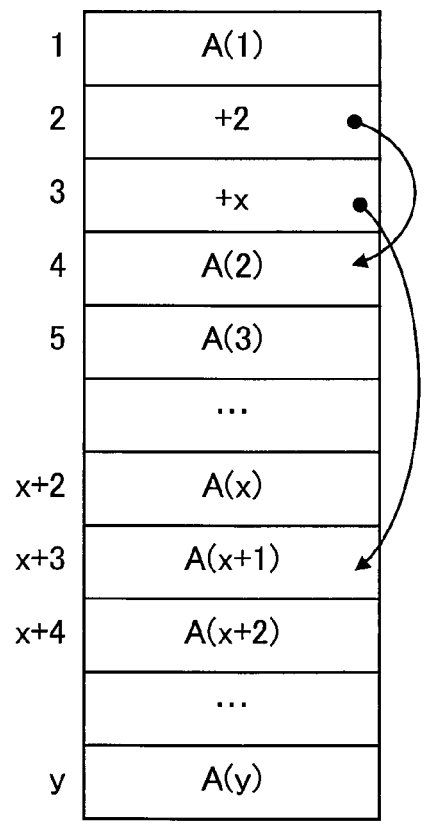
FIG. 7 is a conceptual diagram showing an example of the case where a relative-address pointer is employed as a pointer in structured data to be processed by the data processing apparatus according to the first exemplary embodiment of the present invention.

FIGS. 1 to 3 are diagrams regarding the configuration of a data processing apparatus according to a first exemplary embodiment of the present invention. FIG. 4 and FIG. 5 are diagrams regarding operations of the data processing apparatus according to the exemplary embodiment. FIG. 6 and FIG. 7 are conceptual diagrams for describing structured data handled by the data processing apparatuses according to the exemplary embodiment.

(Structured Data)

It is assumed that the data processing apparatus according to the exemplary embodiment handles structured data that includes a pointer. In particular, it is assumed that the data processing apparatus handles structured data that employs as a pointer a relative address whose origin is the address of a word in which the pointer is written (hereinafter referred to as the relative-address pointer).

Firstly, structured data that a data processing apparatus 1 according to the exemplary embodiment handles as a processing object will be described. FIG. 6 shows an example illustrating a structure of structured data that the data processing apparatus 1 according to the exemplary embodiment handles as a processing object. In the structure shown in FIG. 6, two pointers are extending from a value A(1). Out of the two pointers, one pointer points to values A(2), A(3), . . . , A(x), and the other pointer points to values A(x+1), A(x+2), . . . , A(y). Incidentally, x and y are natural numbers.

FIG. 7 is a conceptual diagram in which the structure shown in FIG. 6 is expressed as structured data. Each box shown in FIG. 7 represents a piece of data, and the number marked with on the left side of each piece of data shows an address where a piece of data is stored. Incidentally, arrows which are shown in FIG. 7 show the addresses which the pointers point to. In FIG. 7, a relative-address pointer that points to an address 4 is +2, which is a value obtained by subtracting 2, which is a storage address of the relative-address pointer, from 4, which is a storage address of data A(2). Similarly, a relative-address pointer that points to an address x+3 is +x, which is a value obtained by subtracting 3, which is the storage address of the relative-address pointer, from x+3, which is the storage address of data A(x+1).

Thus, in the exemplary embodiment, structured data that includes relative addresses whose origin is the address of a word in which a pointer is written (a relative-address pointer) is handled.

(Configuration)

Next, a configuration of the data processing apparatus 1 according to the exemplary embodiment will be described in detail.

FIG. 1 is a block diagram showing a functional configuration of a data processing system that includes the data processing apparatus 1 according to the exemplary embodiment of the present invention. The data processing system according to the exemplary embodiment includes the data processing apparatus 1, a first storage area 2, and a second storage area 3.

The first storage area 2 can be realized, for example, as a memory that is a main storage device. The second storage area 3 can be realized, for example, as a register file of a central processing unit (CPU).

The data processing apparatus 1 includes a processing unit that executes the loading and storage of structured data that includes as a pointer a relative address whose origin is the address of a word in which the pointer is stored. As shown in FIG. 2, the processing unit has a selection unit 10, a computation unit 20, and an address conversion unit 30.

The address conversion unit 30 receives as an input an address signal made up of a logical address (hereinafter referred to as the logical address), and converts the input address signal from the logical address to a physical address. Then, the address conversion unit 30 outputs the address signal converted into the physical address (hereinafter referred to as the physical address), to the first storage area 2.

The address signal in the exemplary embodiment is input as a logical address. For example, when it is written in an instruction that the address is an immediate value, the address signal is a signal output from an instruction decoder (not shown). Furthermore, for example, when a register number, which stores the address, is designated in an instruction, the address signal is a signal output from a register file.

The address conversion unit 30 can be realized, for example, as a memory management unit (MMU).

The address conversion unit 30 has a correspondence table of logical pages and physical pages, and associates the logical pages and the physical pages by a paging method. The logical pages in the correspondence table are assigned some of the logical addresses (e.g., upper addresses excluding portions that correspond to the size of the page) as logical page numbers. In the correspondence table, the logical pages and the physical pages are associated by associating a certain logical page number with a specific physical page number. Incidentally, the address conversion unit 30 may be configured so as to convert address by a segmentation method or a page segmentation method.

The selection unit 10 receives a logical address and an initial signal as inputs. The initial signal is a signal that is always zero and that is generated within the data processing apparatus 1, and will be hereinafter mainly referred to as zero (0). Then, the selection unit 10 selects and outputs either one of the logical address or zero (0) in response to a control signal. Incidentally, the selection unit 10 may not be configured to input zero (0) as an initial signal, but may be configured to generate and output zero (0) internally in response to the control signal.

The control signal in the exemplary embodiment is a signal from the instruction decoder, and a signal that shows whether the instruction is a load instruction (store instruction) of a pointer or an ordinary load instruction (store instruction). In other words, the control signal is a signal that shows whether the instruction is an instruction to process a pointer.

The selection unit 10 outputs either one of the logical address or zero (0) to the computation unit 20, depending on whether the instruction is the load instruction (store instruction) of a pointer or not. In other words, when the instruction is the load instruction (store instruction) of a pointer, the selection unit 10 outputs a logical address. On the other hand, when the instruction is not the load instruction (store instruction) of a pointer, but an ordinary load instruction, the selection unit 10 outputs zero (0). In other words, the selection unit 10 according to the exemplary embodiment receives an initial signal that is always 0 and a logical address as inputs, and selects and outputs either one of the address signal or the initial signal in response to the control signal that shows whether the instruction is the instruction to process a pointer or not.

The computation unit 20 executes computation processing using the value (the logical address or 0) output by the selection unit 10, and the data input from the first storage area 2 or the second storage area 3. The computation unit 20 causes the result of computation processing to be stored in the first storage area 2 or the second storage area 3.

When a load instruction is issued and the computation unit 20 has acquired read-out data from the first storage area 2, the computation unit 20 adds the output value of the selection unit 10 (the logical address or 0) to the read-out data acquired from the first storage area 2. Then, the computation unit 20 causes the result of computation to be stored in the second storage area 3.

Here, when the instruction is the load instruction regarding a pointer, the logical address is input from the selection unit 10, so the read-out data is added to the logical address. On the other hand, when the instruction is not the load instruction regarding a pointer, zero (0) is input from the selection unit 10, so the value of the read-out data remains unchanged.

Furthermore, when a store instruction is issued and the computation unit 20 has acquired data from the second storage area 3, the computation unit 20 subtracts the output value of the selection unit 10 (the logical address or 0) from the data acquired from the second storage area 3. Then, the computation unit 20 causes the result of computation (the read-in data) to be stored in the first storage area 2.

Here, when the instruction is a store instruction regarding a pointer, the logical address is input from the selection unit 10, so the logical address is subtracted from the data acquired from the second storage area. On the other hand, when the instruction is not the store instruction regarding a pointer, zero (0) is input from the selection unit 10, so the value of the data acquired from the second storage area remains unchanged.

FIG. 3 shows a detailed example of internal configuration of the selection unit 10 and the computation unit 20.

As shown in FIG. 3, the selection unit 10 includes a first selection unit 11 and a second selection unit 12. The computation unit 20 includes an addition unit 21 and a subtraction unit 22.

The logical address input to the first selection unit 11 outputs to the addition unit 21 in response to the control signal a logical address when the instruction is the load instruction regarding a pointer, and zero (0) when the instruction is the ordinary load instruction Then, the addition unit 21 adds the value input from the first selection unit 11 (the logical address or 0) to the read-in data input from the first storage area 2.

On the other hand, the logical address input to the second selection unit 12 outputs to the subtraction unit 22 in response to the control signal a logical address when the instruction is the store instruction regarding a pointer, and zero (0) when the instruction is the ordinary store instruction, Then, the subtraction unit 22 subtracts the value input from the second selection unit 12 (the logical address or 0) from the data input from the second storage area 3.

Incidentally, the internal configurations of the selection unit 10 and the computation unit 20 shown in FIG. 3 are examples, and any configuration that has functions similar thereto is included within the scope of the present invention. The configuration of the data processing apparatus 1 according to the exemplary embodiment of the present invention has been described above.

(Operations)

Subsequently, a data processing operation performed by the data processing apparatus 1 according to the first exemplary embodiment of the present invention will be described by using flowcharts shown in FIG. 4 and FIG. 5.

FIG. 4 is a flowchart for describing an operation regarding load performed by the data processing apparatus 1 according to the first exemplary embodiment of the present invention.

In FIG. 4, firstly, an address signal (hereinafter referred to as logical address) and a control signal are input to the selection unit 10 (step S11). The logical address is input to the address conversion unit 30 and the selection unit 10. The control signal is input to the selection unit 10 as a selection signal.

The selection unit 10 selects a value (the logical address or 0) in response to the control signal (step S12).

Here, when the instruction is the load instruction regarding a point (Yes in step S12), the selection unit 10 selects the logical address as the value in response to the control signal (step S13).

On the other hand, when the instruction is not the load instruction regarding a pointer but the ordinary load instruction (No in step S12), the selection unit 10 selects zero (0) as the value in response to the control signal (step S14).

The selection unit 10 outputs the value selected in step S13 or S14 (the logical address or 0) to the computation unit 20 (step S15).

The computation unit 20 acquires data from the first storage area 2 (read-in data) together with the output value of the selection unit 10 (step S16).

The computation unit 20 adds the output value of the selection unit 10 to the data value acquired from the first storage area 2 (step S17). In this step, when the logical address is input (Yes in step S12), the computation unit 20 adds the logical address to the read-in data value acquired from the first storage area 2. On the other hand, when zero (0) is input (No in step S12), the computation unit 20 adds zero (0) to the read-in data acquired from the first storage area 2.

Finally, the computation unit 20 outputs the result of computation to the second storage area 3 (step S18).

In other words, when the logical address is input (Yes in step S12), the value obtained by adding the logical address to the read-in data acquired from the first storage area 2 is the result of computation. On the other hand, when zero (0) is input (No in step S12), the read-in data itself acquired from the first storage area 2 is the result of computation.

FIG. 5 is a flowchart for describing an operation regarding a store performed by the data processing apparatus 1 according to the exemplary embodiment of the present invention.

In FIG. 5, firstly, when an address signal (logical address) is input to the selection unit 10 (step S21), the selection unit 10 selects a value (the logical address or 0) in response to the control signal (step S22).

Here, when the instruction is the store instruction regarding a pointer (Yes in step S22), the selection unit 10 selects the logical address (step S23).

On the other hand, when the instruction is not the store instruction regarding a pointer but the ordinary store instruction (No in step S22), the selection unit 10 selects zero (0) (step S24).

The selection unit 10 outputs the value selected in step S23 or S24 (the logical address or 0) to the computation unit 20 (step S25).

The computation unit 20 acquires data from the second storage area 3 as well as the output value of the selection unit 10 (step S26).

The computation unit 20 subtracts the output value of the selection unit 10 from the data acquired from the second storage area 3 (step S27). Then, when the logical address is input (Yes in step S22), the computation unit 20 subtracts the logical address from the data acquired from the second storage area 3. On the other hand, when zero (0) is input (No in step S22), the computation unit 20 subtracts zero (0) from the data acquired from the second storage area 3.

Finally, the computation unit 20 outputs the result of computation to the first storage area 2 (step S28).

In other words, when the logical address is input (Yes in step S22), the value obtained by subtracting the logical address from the data acquired from the second storage area 3 is the result of computation. On the other hand, when zero (0) is input (No in step S22), the data itself that is acquired from the second storage area 3 is the result of computation.

The data processing operations performed by the data processing apparatus 1 according to the exemplary embodiment of the present invention have been described above.

As stated above, in the data processing apparatus according to the exemplary embodiment, the pointer used in the structured data is a relative address whose origin is the address of a word in which the pointer is written.

Then, in the data processing apparatus according to the exemplary embodiment, an instruction to load a pointer is provided. The instruction to load a pointer is to store into the second storage area (register) the result of addition of the address (logical address) in which the pointer is stored to the data loaded from the first storage area (memory).

Furthermore, in the data processing apparatus according to the exemplary embodiment, an instruction to store a pointer represented by an absolute address in the register is provided. The instruction to store a pointer is to store in the first storage area (memory) the result of subtraction of the address (logical address) in which the pointer is stored from the data stored in the first storage area (memory).

(Effects)

In the data processing apparatus according to the exemplary embodiment, the structured data on the memory is described by using relative-address pointers. Accordingly, the move and copy of the structured data can be realized merely by a simple block transfer of a memory area.

In the data processing that uses relative-address pointers according to the exemplary embodiment, the structured data on the memory is described by using relative-address pointers, so there is no need for the rewriting of a pointer or the like when the structured data is moved or copied to another storage area.

When absolute-address pointers are used, the pointers need to be rewritten, but according to the exemplary embodiment the rewriting of pointers becomes unnecessary, so the move and copy of the structured data can be processed as block data at high speed.

Furthermore, in ordinary relative-address pointers, the beginning address of the structured data is referred to and, therefore, when pointers are used between plural structures, the beginning addresses of a plurality of structures need to be stored in a register. Accordingly, the register area will be in short supply. On the contrary, according to the exemplary embodiment, even if pointers are used between plural structures, the addresses which the pointers point to remain unchanged and the register will not be referred to, so the register area will not be in short supply.

Furthermore, according to the exemplary embodiment, when pointers are loaded from a memory, conversion to the absolute-address pointers can be carried out without other information stored in the register or the like. By providing such a load instruction regarding a pointer, absolute-address pointers are stored in the register, so the reference of the structured data can be speeded up, in comparison with the case where relative-address pointers are stored. In other words, it will become possible to trace the moved or copied structured data at a high speed.

Likewise, according to the exemplary embodiment, when a pointer is stored in a memory, an absolute-address pointer can be converted into a relative-address pointer without other information stored in the register or the like. By providing such a store instruction regarding a pointer, the simple storing causes the absolute-address pointers in the register to be stored in a memory as relative-address pointers. In other words, it will become possible to store such a pointer in a memory as a relative-address pointer handled in the exemplary embodiment that is stored as an absolute-address pointer when the pointer is loaded merely by storing the pointer in a memory again.

The operations performed by the data processing apparatus according to the exemplary embodiment described above are included within the scope of the present invention as long as the method of the exemplary embodiment is applied, even if the operations are realized by an apparatus that has a different configuration from the foregoing data processing apparatuses. Furthermore, data processing programs that cause a computer to execute the data processing method according to the exemplary embodiment are also included in the scope of the present invention. Furthermore, program recording medium in which a data processing program according to the exemplary embodiment are recorded are also included in the present invention.

(Second Exemplary Embodiment)

Next, a data processing apparatus according to a second exemplary embodiment of the present invention will be described.

Figure 8:
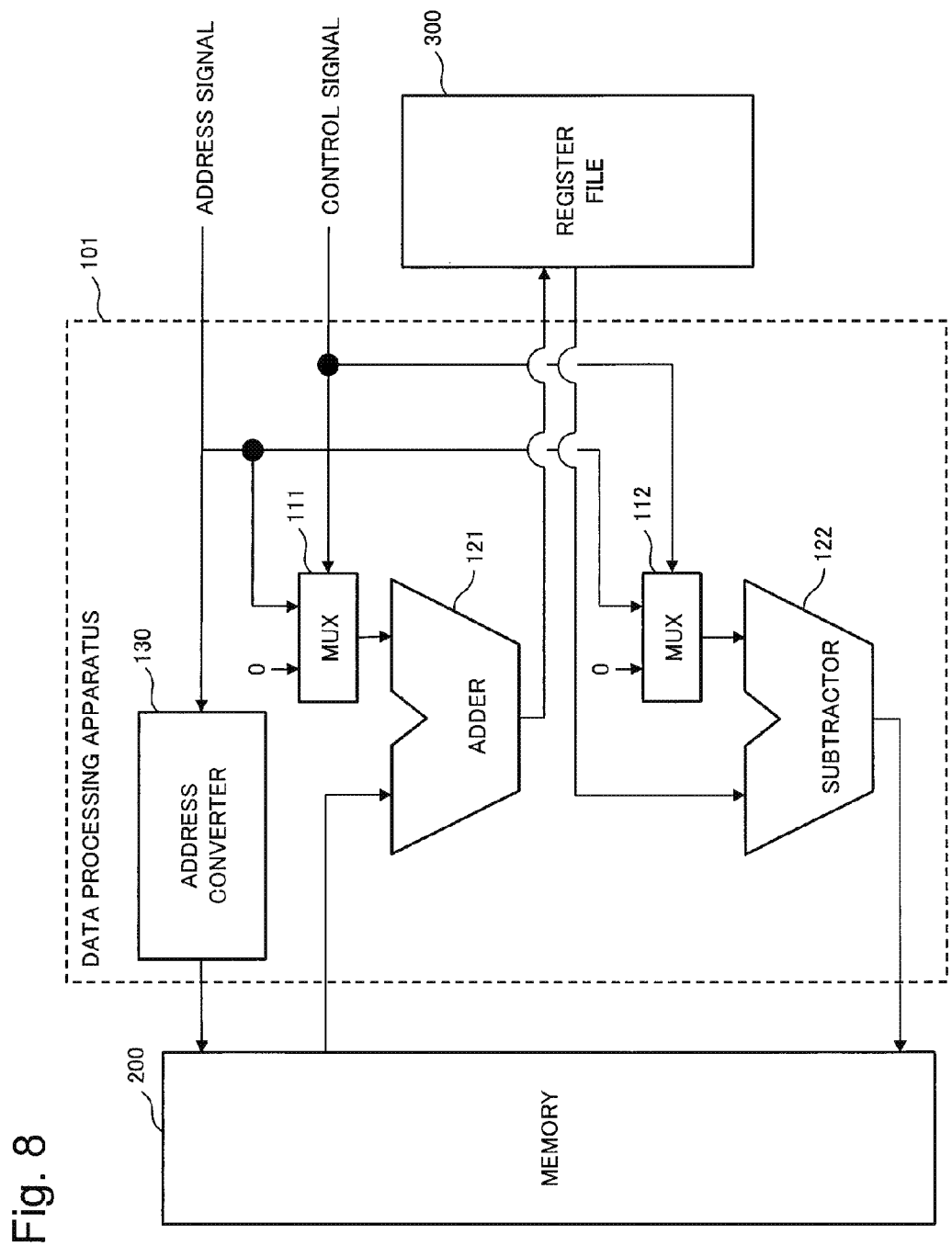
FIG. 8 is a block diagram showing a configuration of a data processing apparatus according to a second exemplary embodiment of the present invention.

FIG. 8 is a functional block diagram showing a configuration of a data processing system that includes a data processing apparatus 101 according to the second exemplary embodiment of the present invention. The data processing system in the exemplary embodiment is configured by a data processing apparatus 101, a memory 200, and a register file 300. Incidentally, the register file 300 is an integration of a plurality of registers.

Furthermore, the data processing apparatus 101 according to the exemplary embodiment includes an address converter 130, an adder 121, a subtractor 122, a first multiplexer 111, and a second multiplexer 112. The data processing apparatus 101 loads and stores pointers between the memory 200 and the register file 300.

The address converter 130 converts a sent address signal (logical address) from a logical address to a physical address. Then, the address converter 130 supplies the address signal (physical address) converted into a physical address to the memory 200.

The adder 121, when loading a pointer, adds the logical address to data (read-out data) acquired from the memory 200.

The first multiplexer 111 selects the logical address or zero (0) as a value to be added to the read-out data from the memory 200 in the adder 121 in response to the control signal that shows whether the load instruction is a load instruction regarding a pointer. The output data of the adder 121 is read into a register designated by the load instruction in the register file 300. Then, when the load instruction is a load instruction regarding a pointer, the absolute-address pointer is loaded into the register.

The subtractor 122, when a pointer is to be stored, subtracts the logical address from data acquired from the register designated by the store instruction within the register file 300.

The second multiplexer 112 selects the logical address or zero (0) as a value to be subtracted from a register of the register file 300 in the subtractor 122 in response to the control signal that shows whether the store instruction is the store instruction regarding a pointer or not. Write-in data that is an output of the subtractor 122 is written into the memory 200. Then, when the store instruction is the store instruction regarding a pointer, a relative-address pointer is stored into the memory 200.

The configuration of the data processing apparatus 101 according to the second exemplary embodiment has been described above.

(Operations)

Next, operations of the load instruction performed by the data processing apparatus 101 according to the exemplary embodiment will be described with reference to FIG. 8. Incidentally, the following description is made with reference to the flowchart shown in FIG. 4, assuming that the first storage area is the memory 200 and the second storage is a register in the register file 300.

Firstly, when a load instruction is issued, an address signal (logical signal) and a control signal are supplied to the data processing apparatus 101. The logical address is input to the address converter 130 and the first multiplexer 111. The control signal is input to the first multiplexer 111 as a selection signal.

The logical address is supplied to the memory 200 as an address signal (physical address) acquired by converting the logical address into a physical address via the address converter 130.

Furthermore, in the first multiplexer 111 in response to the control signal, the logical address is selected, when the instruction is the load of the pointer, and zero (0) is selected when the instruction is not the load of the pointer.

Next, when the read-out data is returned from the memory 200, the adder 121 adds the value selected by the first multiplexer 111 to the read-out data. Then, when the pointer is loaded, the logical memory address is selected, and when the pointer is not loaded, zero (0) is added.

Then, the result of computation by the adder 121 is stored in a register designated by the load instruction within the register file 300.

In the exemplary embodiment, the pointers in the structured data are relative-address pointers from the memory addresses in which the pointers are stored. Accordingly, when the instruction is the load of the pointer, the adder 121 adds the logical address, so the structured data that includes absolute-address pointers is stored in the register.

Operations of the store instruction performed by the data processing apparatus 101 according to the exemplary embodiment will be described with reference to FIG. 8. Incidentally, the following description is made with reference to the flowchart shown in FIG. 5, assuming that the first storage area is the memory 200 and the second storage is a register in the register file 300.

Firstly, when a store instruction is issued, the logical address, the control signal, and the data from a register designated by the store instruction within the register file 300 are supplied to the data processing apparatus 101.

The logical address is converted into a physical address by the address converter 130, and is supplied as the address signal (physical address) to the memory 200. The logical address is input to the address converter 130 and the second multiplexer 112. The control signal is input to the second multiplexer 112 as a selection signal.

Further, in the second multiplexer 112 in response to the control signal, the logical address is selected when the store instruction is the store instruction regarding a pointer, and zero (0) is selected when the store instruction is not the store instruction regarding a pointer.

Furthermore, the subtractor 122 subtracts the value selected by the second multiplexer 112 (the logical address or 0) from the data acquired from the register file 300. Then, the logical address is selected when the instruction is the store instruction regarding a pointer, and zero (0) is subtracted when the instruction is not the store instruction regarding a pointer.

Then the result of computation by the subtractor 122 is supplied to the memory 200 as write-in data.

In the register, absolute-address pointers are stored, and the subtractor 122 subtracts the logical address stored from the pointer described by an absolute-address pointer. As a result, the structured data that includes relative-address pointers from memory addresses where the pointers are stored is stored in the memory 200.

Next, pointers of the structured data according to the exemplary embodiment will be described using the drawings.

Figure 9:
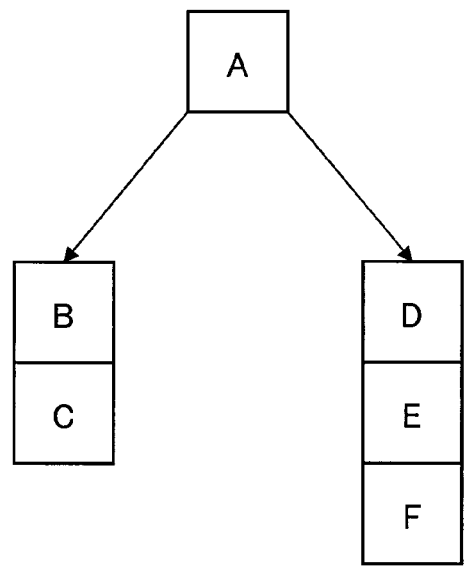
FIG. 9 is a conceptual diagram showing an example of a structure to be processed by the data processing apparatus according to the second exemplary embodiment of the present invention.

FIG. 9 shows an example of a structure expressed by the structured data. In the structure shown in FIG. 9, two pointers are extending from a value A. The two pointers point to BC or DEF.

Figure 10:
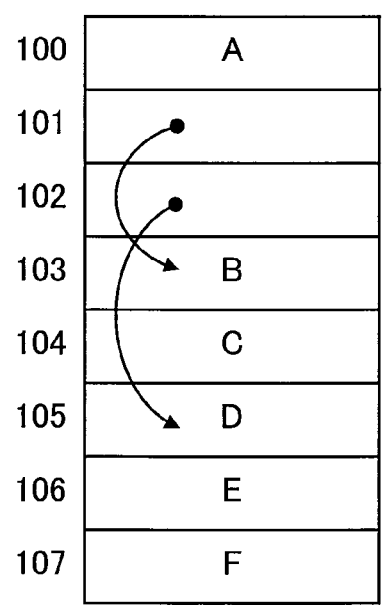
FIG. 10 is a conceptual diagram showing an example of a structure of structured data processed by the data processing apparatus according to the second exemplary embodiment of the present invention.

FIG. 10 shows an example of a structure shown in FIG. 9 as structured data. Incidentally, in FIG. 10, the pointers are schematically shown by arrows, but the arrows are practically shown by some numerical values. The structured data shown in FIG. 10 is stored at addresses 100 to 107.

FIG. 11 shows, as a comparative example, structured data when absolute-address pointers are used to show the arrows in FIG. 10. At the address 101 an absolute-address pointer that points to the address 103 is stored. Furthermore, at the address 102 an absolute-address pointer that points to the address 105 is stored.

FIG. 12 shows, as a comparative example, an example by which the structured data that uses the absolute-address pointers shown in FIG. 11 is copied to addresses 200 to 207. The values of the absolute-address pointers at the addresses 201 and 202 need to be rewritten into the addresses 203 and 205 respectively.

FIG. 13 shows structured data when relative-address pointers are used according to the present invention for the arrows shown in FIG. 10. The relative-address pointer that points to the address 103 has a value of +2 obtained by subtracting 101, which is the storage address of the relative-address pointer, from 103. The relative-address pointer that points to the address 105 has a value of +3 obtained by subtracting 102, which is the storage address of the relative-address pointer, from 105.

FIG. 14 shows an example by which the structured data that uses the relative-address pointers according to the exemplary embodiment shown in FIG. 13 is copied to the addresses 200 to 207. In the structured data that uses the relative-address pointers of the exemplary embodiment, the values of the pointers do not need to be rewritten when the data is moved or copied to different addresses. Accordingly, the structured data can be merely moved as it is as a data block.

Thus, if the relative-address pointers according to the exemplary embodiment are used, neither move nor copy to different addresses requires the values of the pointers to be rewritten, so the move and the copy can be processed at higher speed than in the comparative example in which the absolute-address pointers are used. Furthermore, the beginning address of the structured data needs to be stored in a register in case of the ordinary relative-address pointers, the relative-address pointers according to the present invention do not need a register to be referred to, because the origin of each pointer is the address of a word in which the pointer is stored.

Next, load operations performed by the data processing apparatus 101 according to the second exemplary embodiment will be described by using an example of the structured data.

Figure 15:
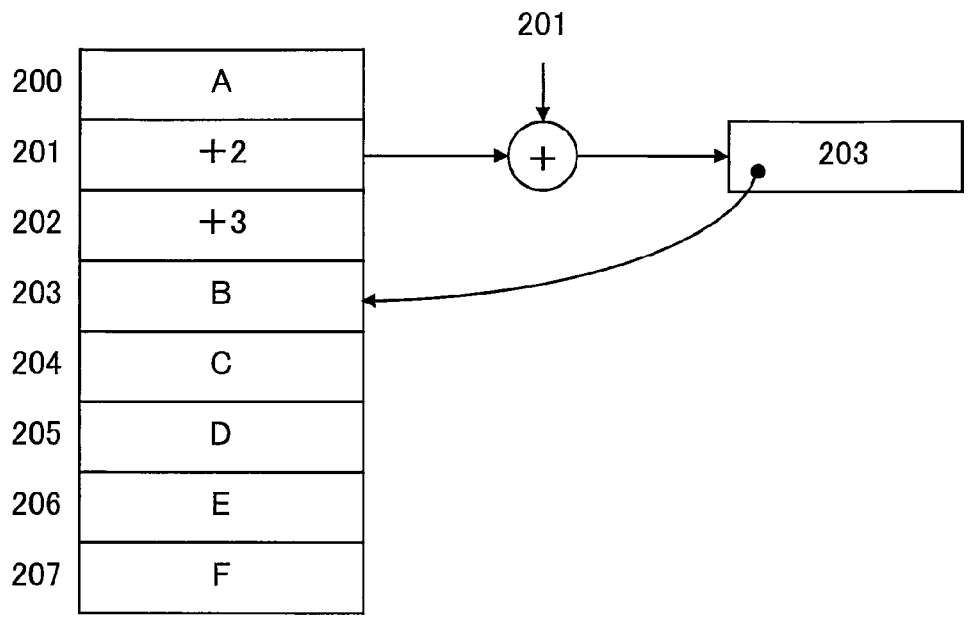
FIG. 15 is a conceptual diagram showing an example of a processing in which the data processing apparatus according to the second exemplary embodiment of the present invention loads a pointer.

FIG. 15 is a conceptual diagram for describing an example in which the pointer at the address 201 in the structured data shown in FIG. 14 is loaded by the data processing apparatus 101. FIG. 15 shows that the value 203 of the absolute-address pointer is stored in a register (in the register file 300) that is designated by the load instruction, when the pointer (+2) is loaded from the address 201.

Figure 16:
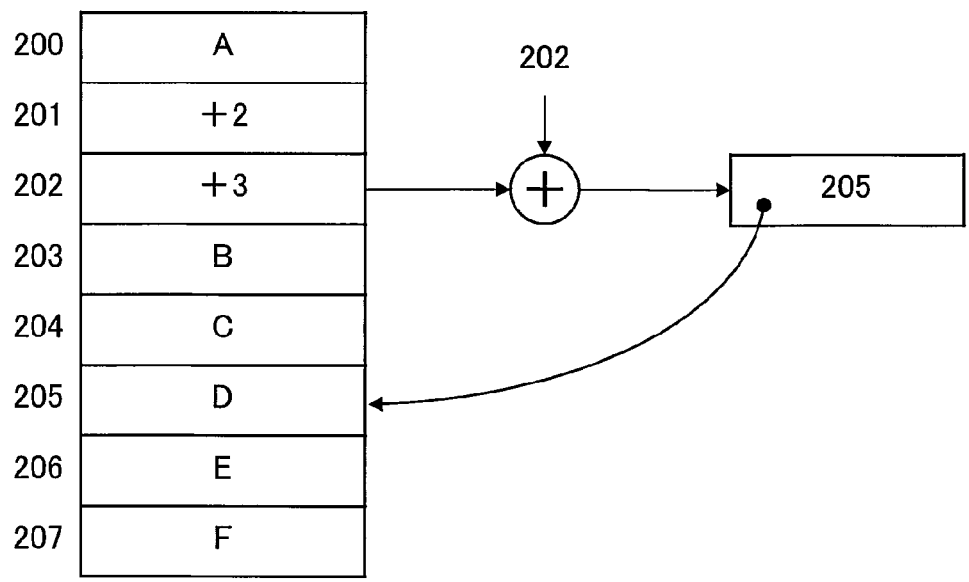
FIG. 16 is a conceptual diagram showing an example of a processing in which the data processing apparatus according to the second exemplary embodiment of the present invention loads a pointer.

FIG. 16 is a conceptual diagram for describing an example in which the pointer at the address 202 in the structured data shown in FIG. 14 is loaded by the data processing apparatus 101. FIG. 16 shows that the value 205 of the absolute-address pointer is stored in a register that is designated by the load instruction, when the pointer (+3) is loaded from the address 202. Next, store operations performed by the data processing apparatus 101 according to the second exemplary embodiment will be described.

Figure 17:
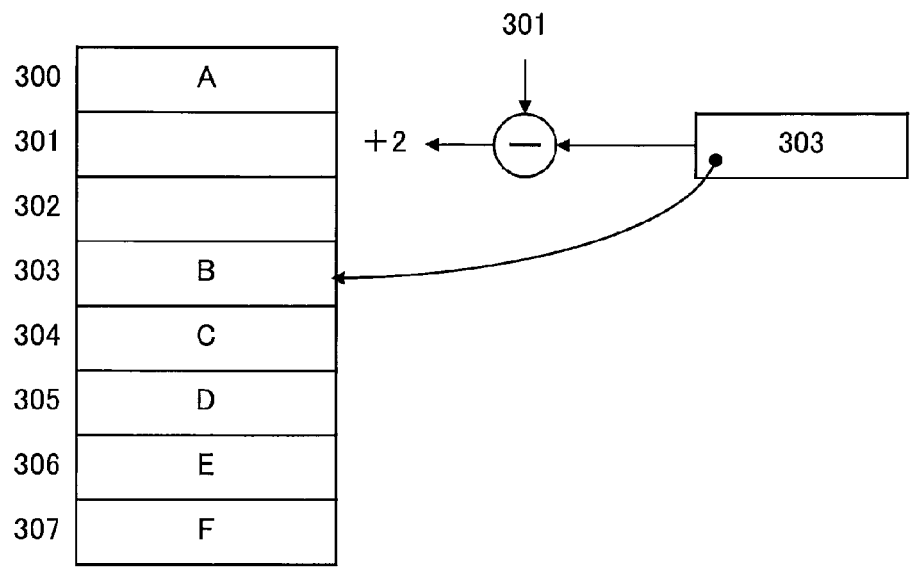
FIG. 17 is a conceptual diagram showing an example of a processing in which the data processing apparatus according to the second exemplary embodiment of the present invention stores a pointer.

FIG. 17 shows a process in which the structured data as shown in FIG. 10 is created at the addresses 300 to 307 by using relative-address pointers in the exemplary embodiment. FIG. 17 shows an example in which the data processing apparatus 101 stores an absolute-address pointer 303 in an address 301 of the memory 200 upon receiving a store instruction. On this occasion, the subtractor 122 subtracts the logical address 301 from the address 303 of the absolute-address pointer 303. As a result, the relative-address pointer (+2) is stored at the address 301 of the memory 200.

Figure 18:
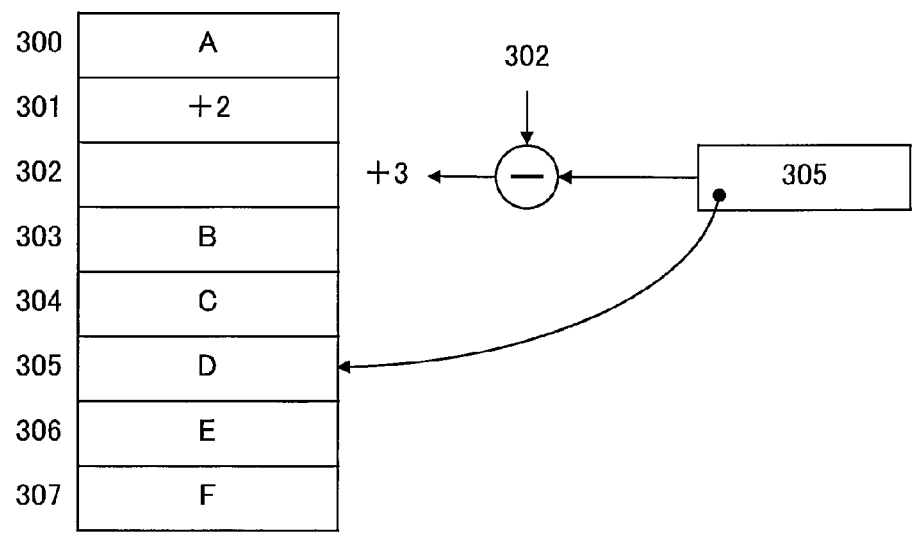
FIG. 18 is a conceptual diagram showing an example of a processing in which the data processing apparatus according to the second exemplary embodiment of the present invention stores a pointer.

FIG. 18 shows a process in which the structured data shown in FIG. 10 is created at the addresses 300 to 307 by using the relative-address pointers in the exemplary embodiment. FIG. 18 shows an example in which the data processing apparatus 101 stores an absolute-address pointer 305 at the address 302 of the memory 200 upon receiving a store instruction. On this occasion, the subtractor 122 subtracts the logical address 302 from the address 305 of the absolute-address pointer 305, the relative-address pointer (+3) is stored at the address 302 of the memory 200.

(Third Exemplary Embodiment)

Figure 19:
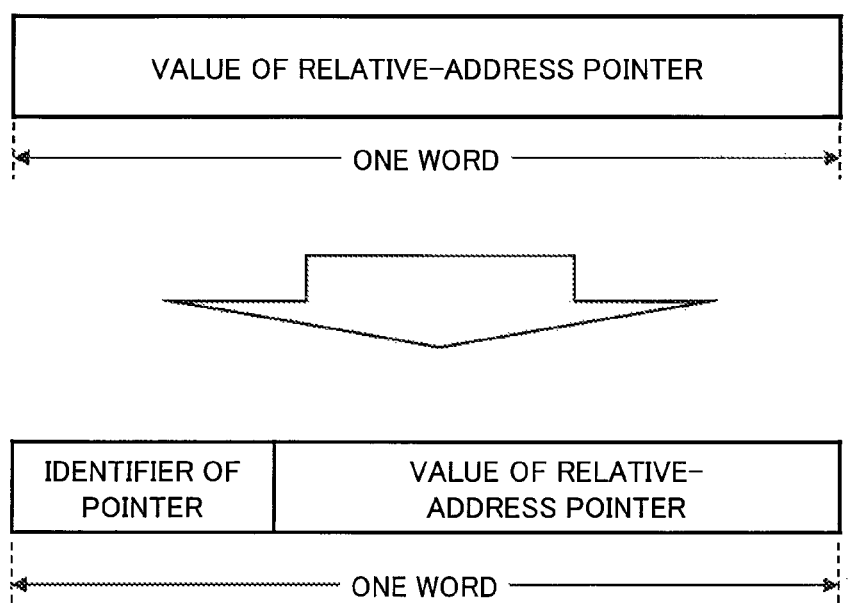
FIG. 19 is a conceptual diagram showing an example of a relative-address pointer stored in a memory according to a third exemplary embodiment of the present invention stores.

Next, a third exemplary embodiment of the present invention will be described. It is assumed that each of the relative-address pointers according to the second exemplary embodiment uses one whole word. Accordingly, in the computation processing performed by the data processing apparatus 101 according to the second exemplary embodiment, the whole word is either added or subtracted. In contrast, the third exemplary embodiment shows an example that reduces the bit width of each of the relative-address pointers and that embeds an identifier in the surplus portion, to show that the identifier is a pointer. FIG. 19 shows a relative-address pointer on a memory according to the third exemplary embodiment.

Figure 20:
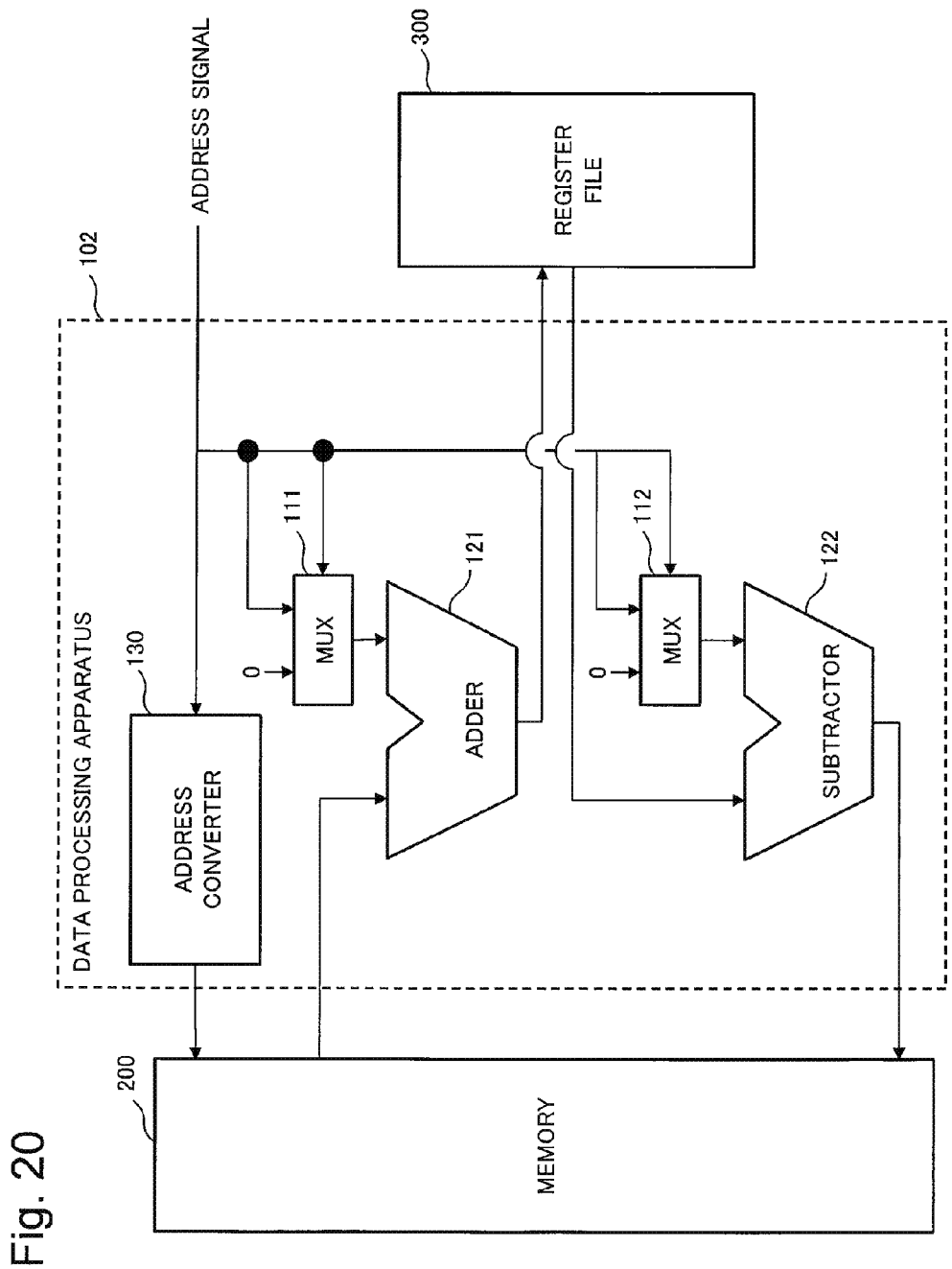
FIG. 20 is a functional block diagram showing a configuration of a data processing apparatus according to the third exemplary embodiment of the present invention.

Use of the relative-address pointer according to the third exemplary embodiment makes it possible to determine whether the instruction is an instruction regarding a pointer only from the address signal without inputting a control signal. Accordingly, it becomes possible to commonize the address signal and the control signal, and it also becomes possible to configure a data processing apparatus 102 of a configuration as shown in FIG. 20. According to the data processing apparatus 102 of a configuration as shown in FIG. 20, it becomes possible to commonize the address signal and the control signal, so the circuit configuration will be simplified.

The previous description of exemplary embodiments is provided to enable a person skilled in the art to make and use the present invention. Moreover, various modifications to these exemplary embodiments will be readily apparent to those skilled in the art, and the generic principles and specific examples defined herein may be applied to other exemplary embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A data processing apparatus that executes giving and receiving of structured data including a pointer between a first storage area and a second storage area, the data processing apparatus comprising
a processing unit configured to process the structured data that uses the pointer as a relative address whose origin is an address of a word in which the pointer is stored, wherein the processing unit includes:
an address conversion unit configured to receive, as an input, a logical address of data that is an object on which an instruction is executed, convert the logical address into a physical address, and output the physical address to the first storage area;
a selection unit configured to receive an initial signal that is always 0 and the logical address as inputs, and select and output one of the physical address and the initial signal according to a control signal that indicates whether the instruction is an instruction to process the pointer; and
a computation unit configured to receive an output of the selection unit as an input, execute computation by using the output of the selection unit and data obtained from the first storage area or the second storage area, and convert between a relative address and an absolute address.

2. The data processing apparatus according to claim 1, wherein the instruction includes a load instruction indicating that a computation result obtained by adding the logical address to data loaded from the first storage area be stored as read-in data in the second storage area.

3. The data processing apparatus according to claim 1, wherein the instruction includes a store instruction indicating that a computation result obtained by subtracting the logical address from data stored in the first storage area be stored as written-in data in the first storage area.

4. The data processing apparatus according to claim 3, wherein the selection unit includes:
a first selection unit configured to select the physical address or the initial signal according to the control signal when the load instruction is received; and
a second selection unit configured to select the physical address or the initial signal according to the control signal when the store instruction is received, and
wherein the computation unit includes:
an addition unit configured to add, when the load instruction is received, an address value of the first storage area specified by the load instruction and a value that is output according to the control signal; and
a subtraction unit configured to subtract the value that is output according to the control signal from a value acquired from the second storage area specified by the store instruction, when the store instruction is received.

5. The data processing apparatus according to claim 4, wherein, when the load instruction is received, the first selection unit selects the logical address if the load instruction is an instruction to process the pointer, and selects the initial signal if the load instruction is not the instruction to process the pointer, and
wherein, when the store instruction is received, the second selection unit selects the logical address if the store instruction is an instruction to process the pointer, and selects the initial signal if the store instruction is not the instruction to process the pointer.

6. The data processing apparatus according to claim 1, wherein
the processing unit processes the structured data that includes, at a site where the pointer including the relative address is written, an identifier indicating that the structured data includes the pointer.

7. A data processing method that executes giving and receiving of structured data including a pointer between a first storage area and a second storage area, the data processing method comprising
processing the structured data that uses the pointer as a relative address whose origin is an address of a word in which the pointer is stored, wherein
receiving, as a input, a logical address of data that is an object on which an instruction is executed, converting the logical address into a physical address, and outputting the physical address to the first storage area;
receiving an initial signal that is always 0 and the logical address as inputs, and selecting and outputting one of the physical address and the initial signal according to a control signal that indicates whether data is a pointer; and
receiving an output of the selection unit as an input, executing computation by using the output of the selection unit and data obtained from the first storage area or the second storage area, and converting between a relative address and an absolute address.

8. A non-transitory program recording medium which records a data processing program that processes structured data including a pointer, the data processing program causing a computer to execute:
when the structured data that uses the pointer as a relative address whose origin is an address of a word in which the pointer is stored is transferred between a first storage area and a second storage area,
a process of receiving, as an input, a logical address of data that is an object execution of an instruction, converting the logical address into a physical address, and outputting the physical address to the first storage area;
a process of receiving an initial signal that is always 0 and the logical address as inputs, and selecting and outputting either one of the physical address or the initial signal according to a control signal that indicates whether data stored at the logical address is the relative address; and
a process of receiving an output of the selection unit as an input,
performing a computation by using the output of the selection unit and data obtained from the first storage area or the second storage area, and converting the relative address into an absolute address.

* * * * *